US011123756B1

(12) United States Patent
Schiller

(10) Patent No.: US 11,123,756 B1
(45) Date of Patent: Sep. 21, 2021

(54) DECORATIVE TEXTURE FOR WALL AND CEILING SURFACES

(71) Applicant: Carl Schiller, Brush Prairie, WA (US)

(72) Inventor: Carl Schiller, Brush Prairie, WA (US)

( * ) Notice: Subject to any disclaimer, the term of this patent is extended or adjusted under 35 U.S.C. 154(b) by 40 days.

(21) Appl. No.: 16/353,388

(22) Filed: Mar. 14, 2019

(51) Int. Cl.
*B64D 1/16* (2006.01)
*B05B 3/08* (2006.01)
*E04F 21/02* (2006.01)

(52) U.S. Cl.
CPC .............. *B05B 3/082* (2013.01); *E04F 21/02* (2013.01)

(58) Field of Classification Search
CPC . B05B 3/082; B05B 3/08; E04F 21/02; B05D 1/40
See application file for complete search history.

(56) References Cited

U.S. PATENT DOCUMENTS 2,763,510 A * 9/1956 Di Nicola ................ B44D 3/22 239/220
2,865,325 A * 12/1958 Leston ...................... B05B 3/02 118/300
5,915,627 A * 6/1999 Plasko ...................... B05B 3/02 239/215
7,429,297 B1 * 9/2008 Chandler ................ E04F 21/10 118/303
2016/0215509 A1 * 7/2016 Weldy ....................... B05B 3/08

OTHER PUBLICATIONS

Website Screen shot, Pro Grade Wall Texture, Orange Peel, Oil Based, 25 oz.
Website Screen shot, Powertex Texture Sprayer.

* cited by examiner

*Primary Examiner* — Nathan T Leong
(74) *Attorney, Agent, or Firm* — Chernoff, Vilhauer, McClung & Stenzel, LLP

(57) ABSTRACT

A texture material applicator and a method for applying texture material to a wall or ceiling surface to produce a desired surface texture and appearance. A selected one of several different rotary dispenser inserts is rotated within a chamber in a body of the applicator, picking up a quantity of texture material on each of a plurality of spatter elements. The spatter elements are resiliently bent by a regulator and throw bits or drops of texture material out from the chamber and radially outward through an outlet opening in the body of the applicator as the spatter elements spring away from a release edge of the regulator. Different textures may be provided by using different rotary dispenser inserts having different spatter elements differently located on the rotary dispenser.

13 Claims, 20 Drawing Sheets

DECORATIVE TEXTURE FOR WALL AND CEILING SURFACES

BACKGROUND OF THE INVENTION

The present invention relates to textured surfaces of walls and ceilings, and in particular to a method and apparatus for applying a texture material on a portion of a wall or ceiling surface so that the newly created texture matches surrounding previously existing texture satisfactorily.

When an area of a textured wall or ceiling has been repaired by installation of a piece of new wallboard or other material with a flat surface, it is necessary to apply texture material to the flat surface to make it match the surrounding original texture of the wall or ceiling in order to have a satisfactory final appearance that does not draw attention to the fact that a repair has been effected. A desired texture may be created by application of texture material containing, for example, powdered lime, talc, and binders, to accumulate a desired thickness and distribution in an irregular surface configuration.

Texture material can be applied using a hand pumped applicator device similar to a bug sprayer, but use of such an applicator rarely results in consistent texture and satisfactory appearance. Texture material is also available in pressurized cans with adjustable nozzles that are intended to apply texture material so as to result in a texture similar to any of various common texture types, such as “orange peel”, “knockdown” and “popcorn” textures. Use of such pressurized cans of texture material by a do-it-yourselfer, however, requires familiarization and practice, and often results in waste of more such material than is successfully applied to match the original surrounding texture satisfactorily. Additionally, when a project has been completed using such pressurized cans the cans are discarded and usually end up in landfills rather than being able to be recycled. Since the pressurized cans of texture material are expensive and result in empty containers that cannot be recycled, it would be preferable to be able to add texture to a repaired portion of a wall or ceiling at a lesser expense, with more predictable resulting texture, and without adding to problems of waste disposal.

What are needed, then, are an apparatus capable of applying texture material reliably in such a way as to provide a desired appearance to match any of several different texture types, and a method of reliably applying texture material to achieve a desired texture form and appearance without an excessive amount of experimentation.

SUMMARY OF THE INVENTION

The present invention provides a texture applicator having a body that defines a chamber in which a rotary dispenser is supported so that it can be rotated to deliver texture material from the chamber onto a wall or ceiling and create a texture that matches and blends in with the appearance of existing texture on an adjacent wall or ceiling surface.

In one embodiment of the apparatus disclosed herein there is a receptacle where a container of texture material can be attached, permitting the texture material to be received in the chamber at a controlled rate so as to be applied by use of the applicator device.

Another aspect of the present invention is the method disclosed herein for applying texture material to a surface to achieve a desired texture, by use of flexible spatter elements of a rotary dispenser to individually pick up small amounts of texture material and throw them outward as the spatter elements are bent and then released during rotation of the rotary dispenser within the chamber of the texture applicator.

The foregoing and other objectives and features of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF PREFERRED EMBODIMENTS

Figure 1:
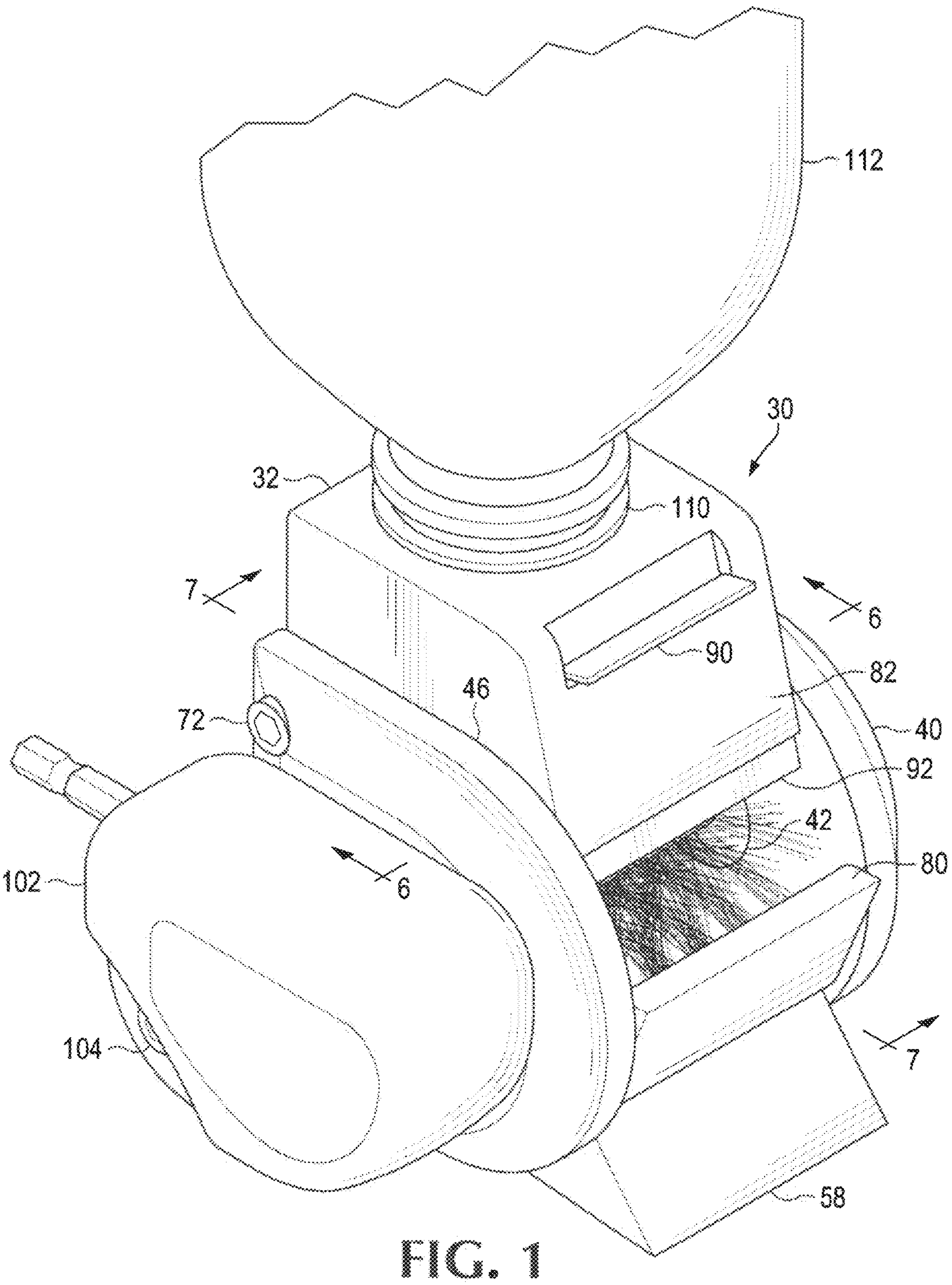
FIG. 1 is an isometric view of the front of a surface texture material applicator embodying the present invention together with an associated drive mechanism and a portion of a container for surface texture material to be applied by use of the device.

Referring now to the drawings that form a part of the disclosure herein, in FIGS. 1-7 a surface texture material applicator 30 has a body 32 that defines a chamber 34 which may be generally cylindrical, with, for example, an internal diameter 36 of 60 mm and an internal length 38 of 54 mm. A first end cover plate 40, which may be called a left end of the body, includes a bearing cavity 42 that serves as a bearing and a receptacle for a first end 43 of a rotary dispenser insert 44. At the other end, that may be called a right end of the body 32, a right end cover or end plate 46 is selectively removable from the body to open the right end of the cylindrical chamber 34 to give access to the rotary dispenser insert 44.

The right end plate 46 defines an opening 48 that extends through the right end plate as a bearing, and a shaft extension 50 portion of the rotary dispenser insert extends outwardly through the opening 48. Threads may be machined on the outer end of the shaft extension so that a crank or another mechanism may be attached drivingly to the shaft extension 50 of the insert and may be used to rotate the rotary dispenser insert 44 within the chamber 34. The bearing cavity 42 or receptacle for the first end 43 of a rotary dispenser insert 44 and the opening 48 for a shaft extension 50 of an insert 44 jointly define a central axis 52 of the chamber about which a rotary dispenser insert can be rotated.

Figure 2:
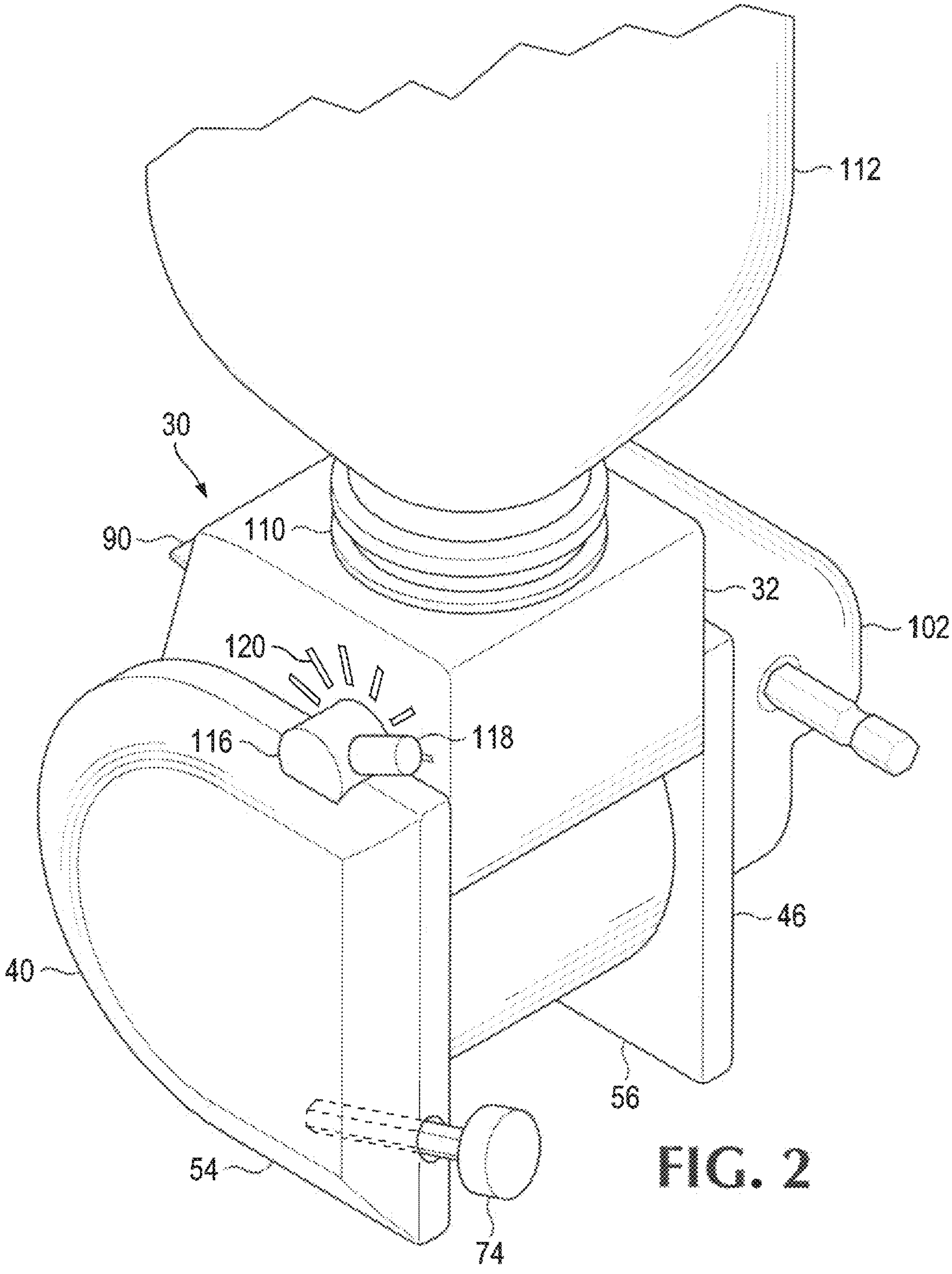
FIG. 2 is an isometric view of the surface texture material applicator, drive mechanism, and portion of a container shown in FIG. 1, as seen from the rear.
Figure 3:
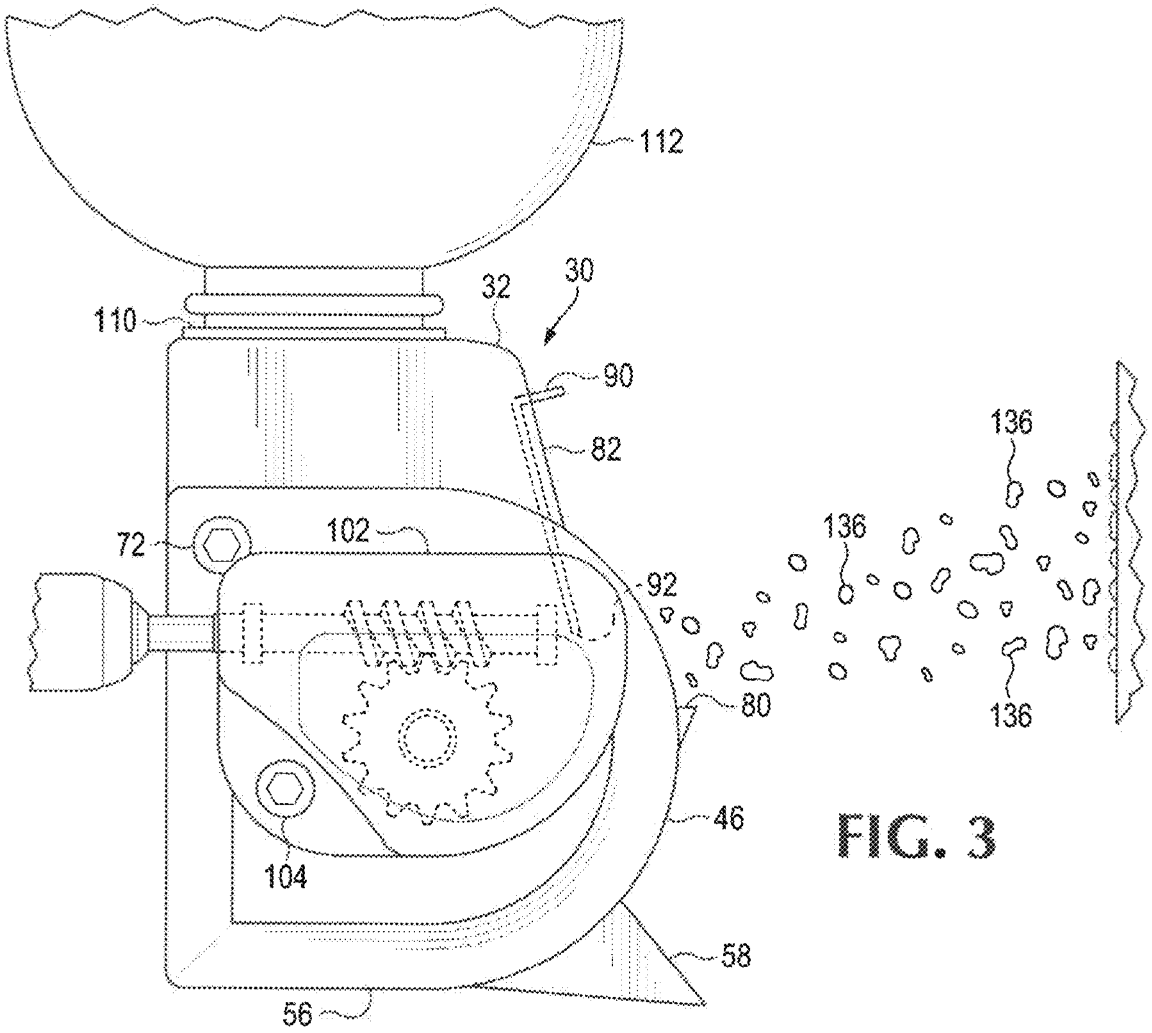
FIG. 3 is a side elevational view of the surface texture material applicator and portion of a container shown in FIGS. 1 and 2, showing texture material being applied to a wall surface by use of the applicator.

The left and right end plate members 40 and 46 defining the ends of the body 32 may extend downward below the chamber 34 and have a pair of respective bottom margins 54 and 56 defining a base plane or bottom of the body 32. Additionally, there may be a support base 58 extending forward and downward from the middle of the body 32 to the base plane, so that the body may conveniently be placed on a table or other flat horizontal surface and remain in an upright orientation as shown in FIGS. 1-3.

Figure 4:
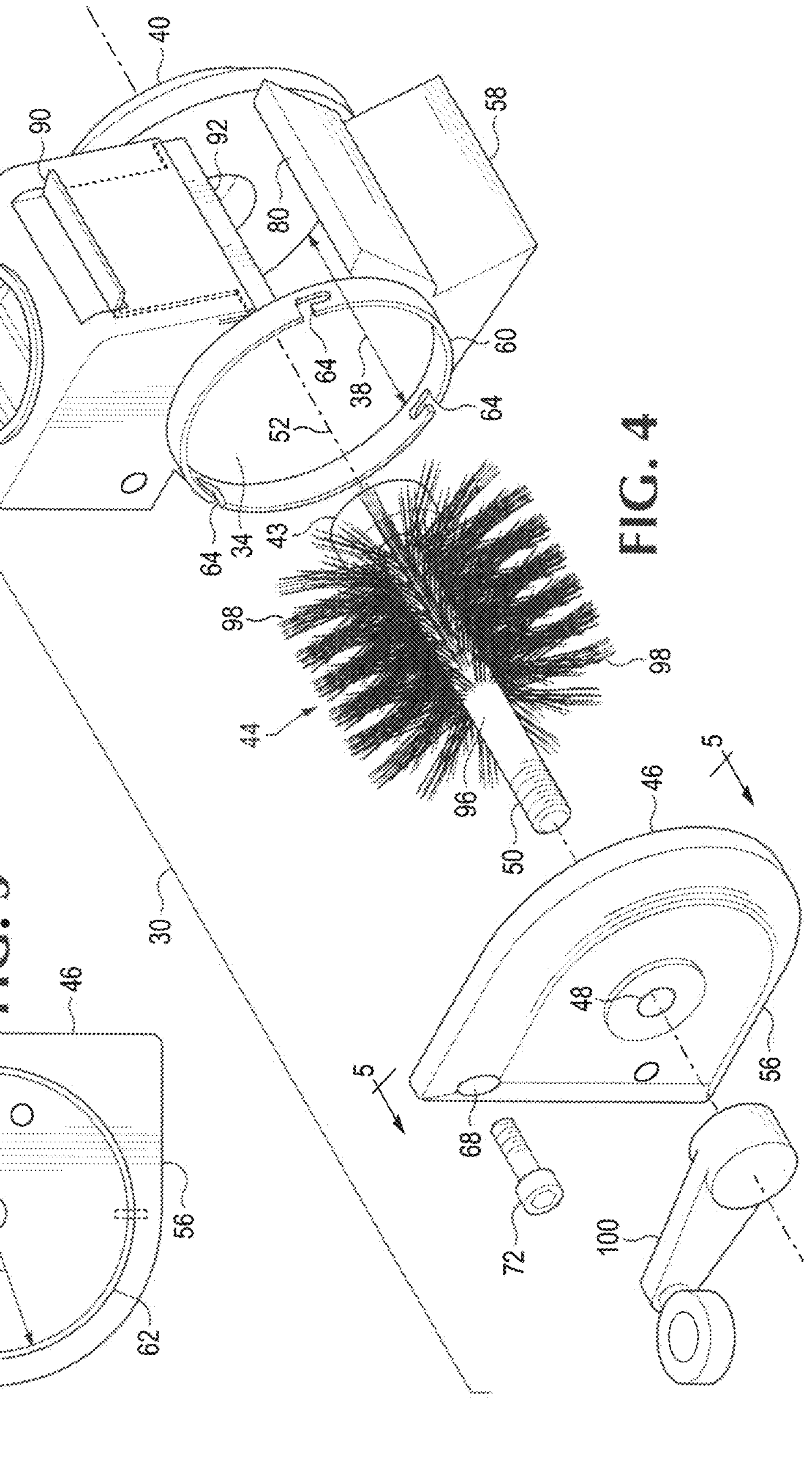
FIG. 4 is an exploded isometric view of the surface texture material applicator shown in FIGS. 1-3 with an end cover removed to expose a chamber defined by the body of the device, and showing a generic rotary dispenser insert in position for installation into the chamber.
Figure 5:
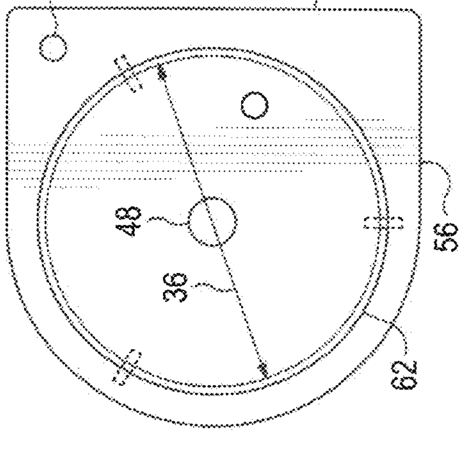
FIG. 5 is an elevational view of an interior face of the end cover shown in FIG. 4, as seen in the direction of line 5-5 in FIG. 4.

As may be seen in FIGS. 4 and 5, the chamber 34 may have a narrow rim 60 extending from its right end, and the right end plate 46 may be connected with the open end of the chamber 34 by engagement of the rim 60 within a groove 62 defined in the inner side of the right end plate 46. L-shaped slots 64 may be provided in the narrow rim 60 at the right end of the chamber, and pins 66 may be included in the right end plate 46, extending across the groove 62, to engage the L-shaped slots 64 and fasten the right end plate 46 to the body 32 of the applicator 30 with a bayonet-mount mechanism. A hole 68 may be provided in the right end plate 46 and a corresponding threaded bore 70 may be provided in the right hand side of the body 32, outside the chamber 34, to receive a locking screw 72 to retain the right end plate 46, keeping it from rotating, once it has been fastened to the body 32 by the bayonet mount. The locking screw 72 may have a hex socket head, and a corresponding hex wrench 74 may be held conveniently in a receptacle in the rear side of the left end plate 40 of the body 32.

Figure 6:
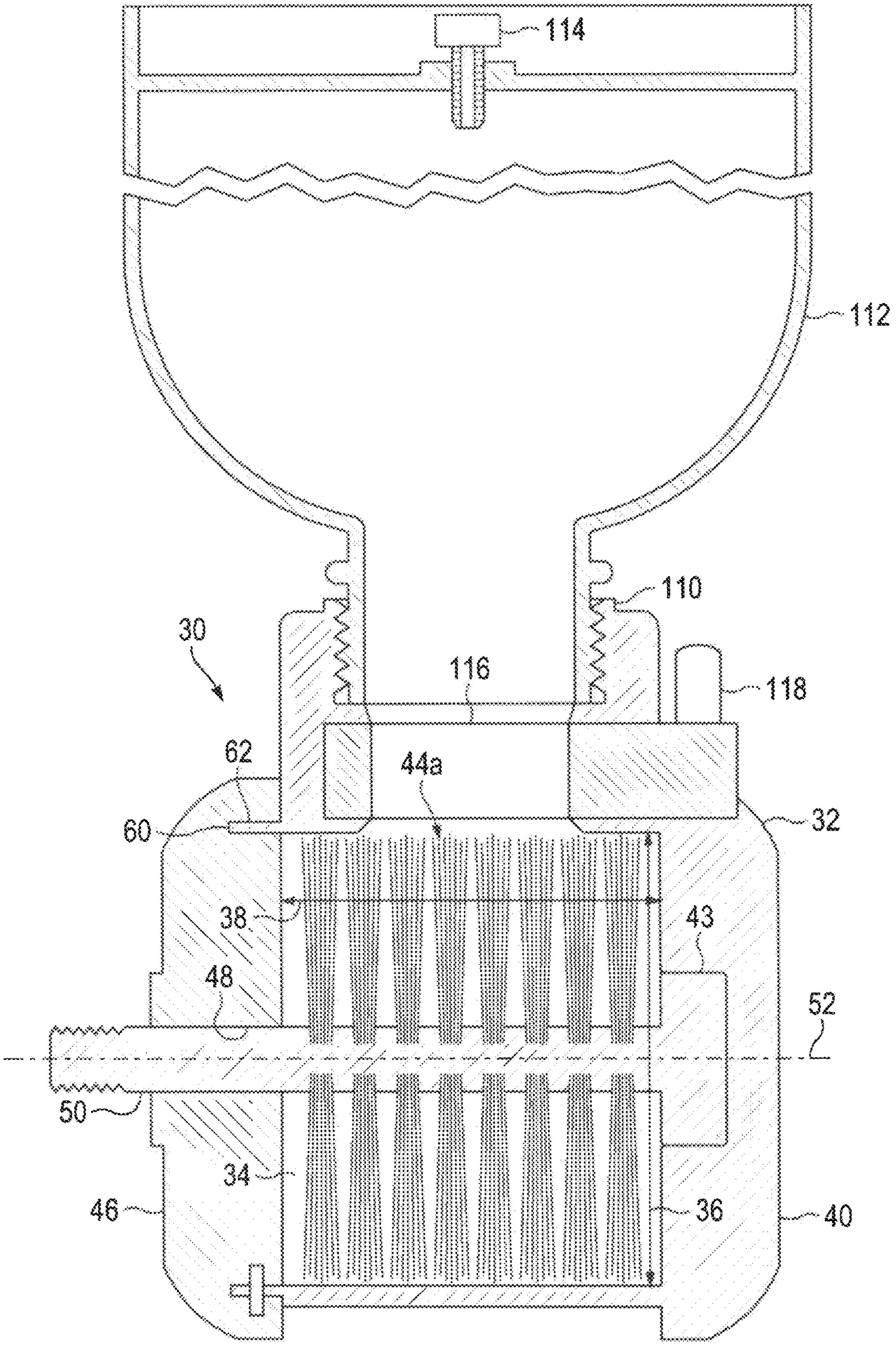
FIG. 6 is a sectional view, taken along a plane defined by line 6-6 in FIG. 1.
Figure 7:
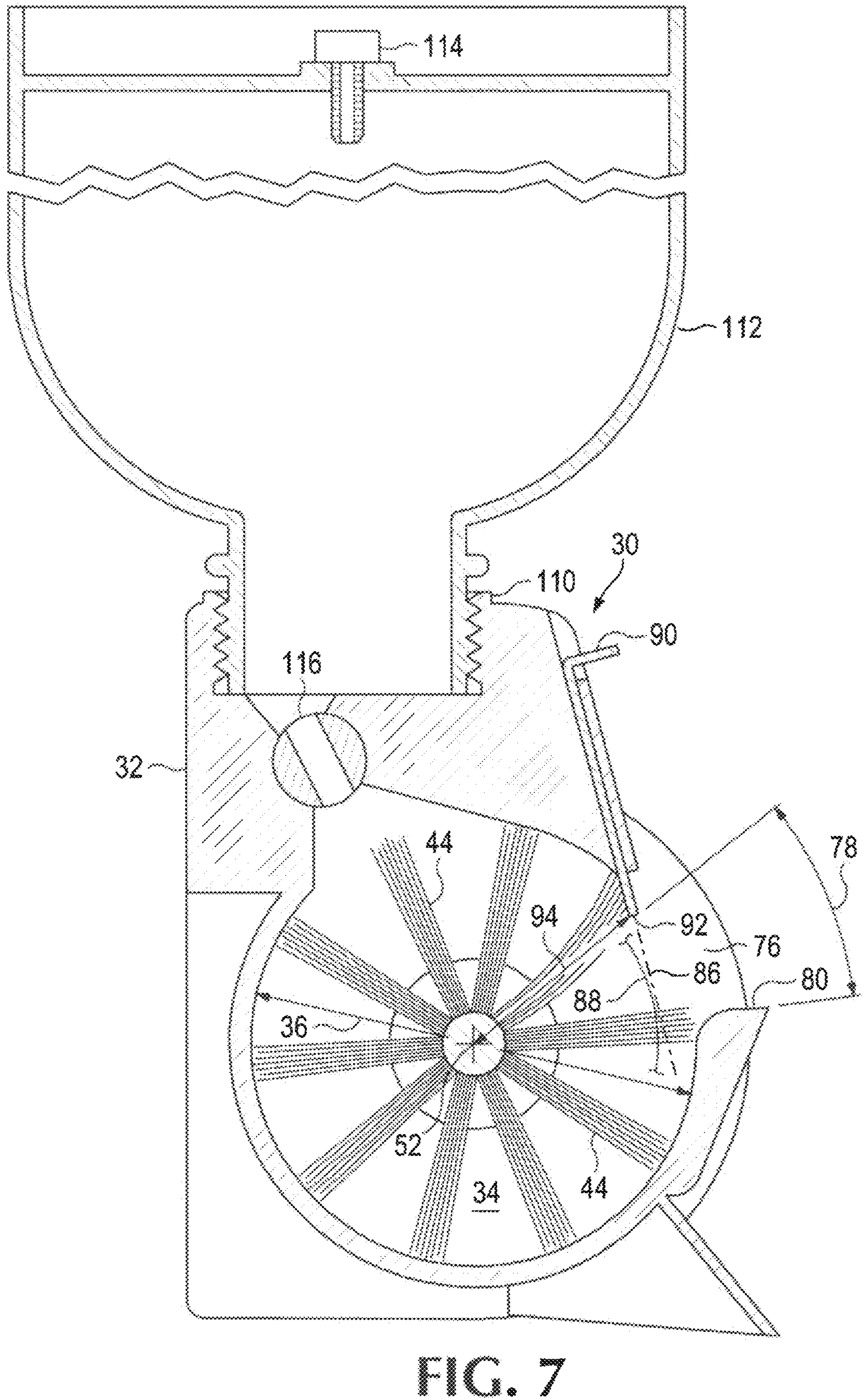
FIG. 7 is a sectional view, taken along a plane defined by line 7-7 in FIG. 1.

Referring now also to FIGS. 6 and 7, at the front end of the body the chamber has an outlet opening 76 or window through which surface texture material may be dispensed during operation of the applicator 30, as will be explained in greater detail hereinbelow. The opening 76 may subtend an angle 78 about the central axis 52, extending up through about 40° from a plane oriented a few degrees, for example 10 degrees, above a horizontal plane including the central axis of rotation 52. A drip catcher 80 extends as a lip along a bottom margin of the opening 76, parallel with the central axis 52 of the applicator 30, and may extend radially outwardly away from the central axis 52, extending beyond the internal radius of the chamber 34 by a small distance such as about 1 cm.

Extending upwardly from an upper margin of the opening in the front of the chamber there is a flat front member 82, and a slot 84 is defined behind the front member. The slot 84 defines a plane 86 that is tangential to an imaginary cylinder 88 centered on the central axis 52 of rotation but having a radius somewhat less than the radius of the interior of the chamber 34. A regulator 90, which may be a flat plate, is mounted in the slot 84 so that it is adjustably movable along the slot, generally along an interior side of the front side member. The regulator 90 has a bottom margin that may be straight and may extend parallel with the central axis 52 of the body and acts as a spatter element release edge 92. The regulator 90 may be movable along the slot 84, between a retracted position, in which the spatter element release edge 92 may be outside the cylindrical cavity defined by the interior surface of the majority of the chamber 34, and a position such as that shown in FIG. 7, in which the spatter element release edge 92 is located inside the chamber 34, at a distance 94 from the central axis 52 that is somewhat less than the radius of the interior cylindrical surface of the chamber 34.

The rotary dispenser insert 44 includes a central body 96, which may be generally in the form of a cylindrical shaft. Several spatter elements 98, etc. are mounted in the central body 96, arranged in a pattern intended to deliver texture material from the chamber 32 to produce a particular type of texture pattern, as will be explained in greater detail below. Other rotary dispenser inserts 44, etc. having several differing arrangements and types of spatter elements may be used to produce correspondingly different textures.

Each of the different rotary dispenser inserts 44, etc. includes a first inner, or left, end 43 of a size and cylindrical shape that fits snugly and rotatably within the bearing cavity or receptacle 42 defined in the left end plate 40 of the body

32. Each of the rotary dispenser inserts 44, etc. also has an outer shaft extension 50 of a size that fits snugly through the bearing opening 48 defined in the removable right end plate 46 of the body 32.

A hand crank 100, shown in FIG. 4, may be threaded onto the external threads on the outer shaft extension 50 to drive the rotary dispenser insert 44. Alternatively, as shown in FIGS. 1-3, a worm gear attachment 102, providing, for example, a 10 to 1 speed reduction, can be threaded onto the outer shaft extension 50 and retained by a screw 104 threaded into the right end plate, as may be seen best in FIG. 3. The worm gear attachment 102 can then be driven conveniently by an electric drill.

The spatter elements 98, etc. of each rotary dispenser insert 44, etc. are mounted so as to extend generally radially from the central body 96, etc. of the particular rotary dispenser insert. The rotary dispenser inserts may all have similar outer diameters that may range from 2 or 3 mm less than the interior diameter 36 of the cylindrical part of the chamber 34 of the body 32 to 2 or 3 mm more than the interior diameter 36 of the chamber 34. A rotary dispenser insert 44, etc. may thus have an interference fit within the cylindrical part of the chamber 34. The individual spatter elements 98, etc. may be resiliently flexible, and may be mounted resiliently in receptacles in the central body 96, etc. of a respective rotary dispenser insert 44, etc.

As shown in FIGS. 1-7, at the top of the surface texture material applicator 30 there is a texture material container receptacle 110 which may have an internal thread of a size to receive and mate with a surface texture material container 112 that may be a molded plastic bottle similar to a commonly available beverage bottle. As shown in FIGS. 6 and 7 an air inlet valve 114 may be provided in the bottom of the surface texture material container 112 so that surface texture material can flow evenly into the chamber.

A surface texture material control valve 116 is located in the upper portion of the applicator 30, in a conduit leading from the texture material container receptacle 110 to the top of the chamber 34 within the body 32. A valve control lever 118 is available on the left side of the applicator, and a scale 120 representing the degree to which the valve is open may be provided on the left side of the body 32, adjacent the valve control lever 118. The control valve 116 can be adjusted conveniently to control the rate at which surface texture material is able to flow into the chamber 34 from the surface texture material container 112. Markings of the scale 120 provide easy reference for adjustment of the control valve 116 for application of surface texture material using a particular rotary dispenser insert to create a particular surface texture.

Figure 8:
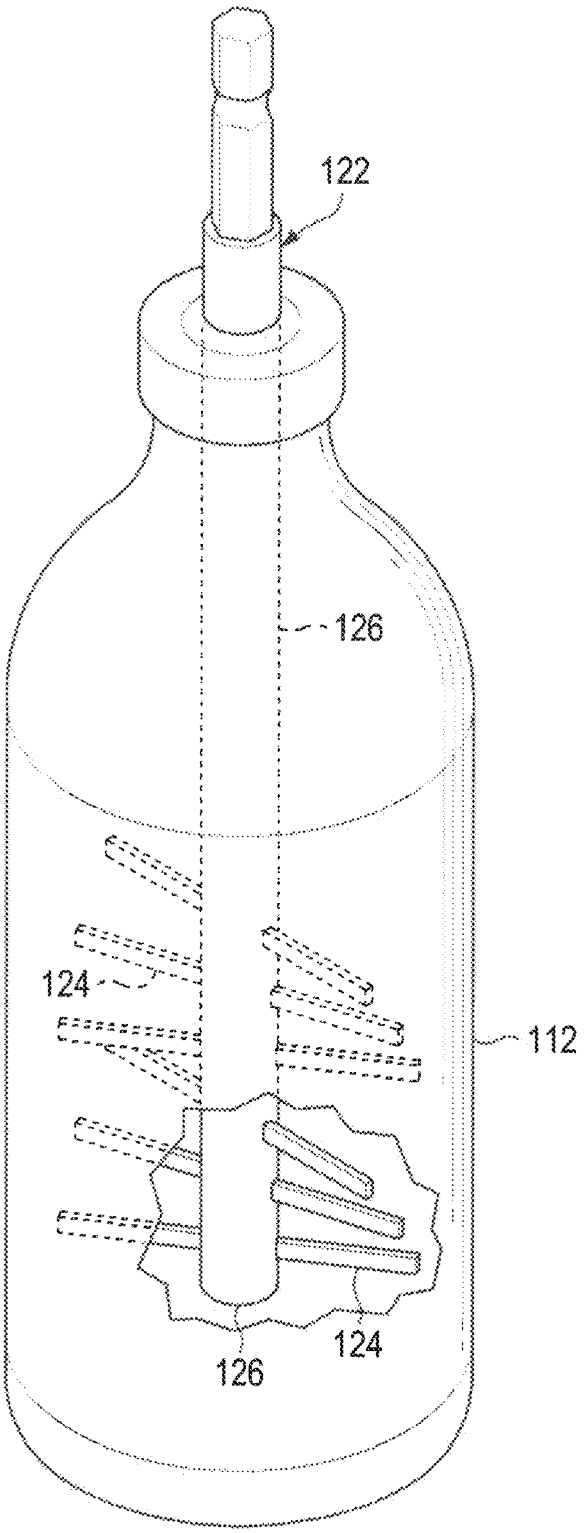
FIG. 8 is a partially cutaway isometric view of a texture material bottle for use with the surface texture material applicator shown in FIGS. 1-7, shown together with a mixer.

Suitable surface texture material is easily prepared from commercially available premixed drywall joint compound, or "mud," that can be mixed with an appropriate amount of additional water to produce surface texture material with a useful, usually cream-like, consistency that can be applied using the applicator 30 disclosed herein. The texture material can be prepared in the surface texture material container bottle 112, shown in FIG. 8, using a mixer 122 having several arms 124 extending from a central shaft 126 that may be rotated by a power drill, for example, to ensure proper preparation of the surface texture material. The arms 124 of the mixer 122 are flexible enough that the mixer can be inserted into the surface texture material container 112 through a conventional 30 mm diameter plastic beverage container neck at its top.

The texture material may be prepared from, for example, commercially available premixed all-purpose drywall joint compound, such as Hamilton "A P" drywall joint compound, prepared to form a Standard Texture Mix by mixing in a proportion of approximately 72 ounces water to a 3.5 gallon box of premixed joint compound. Alternatively, a thinner mix of texture material may be made by use of 96 ounces water to a 3.5 gallon box of premixed joint compound, or a different product such as "Hamilton respray acoustic" may be used when mixed to a desired consistency.

Figure 9:
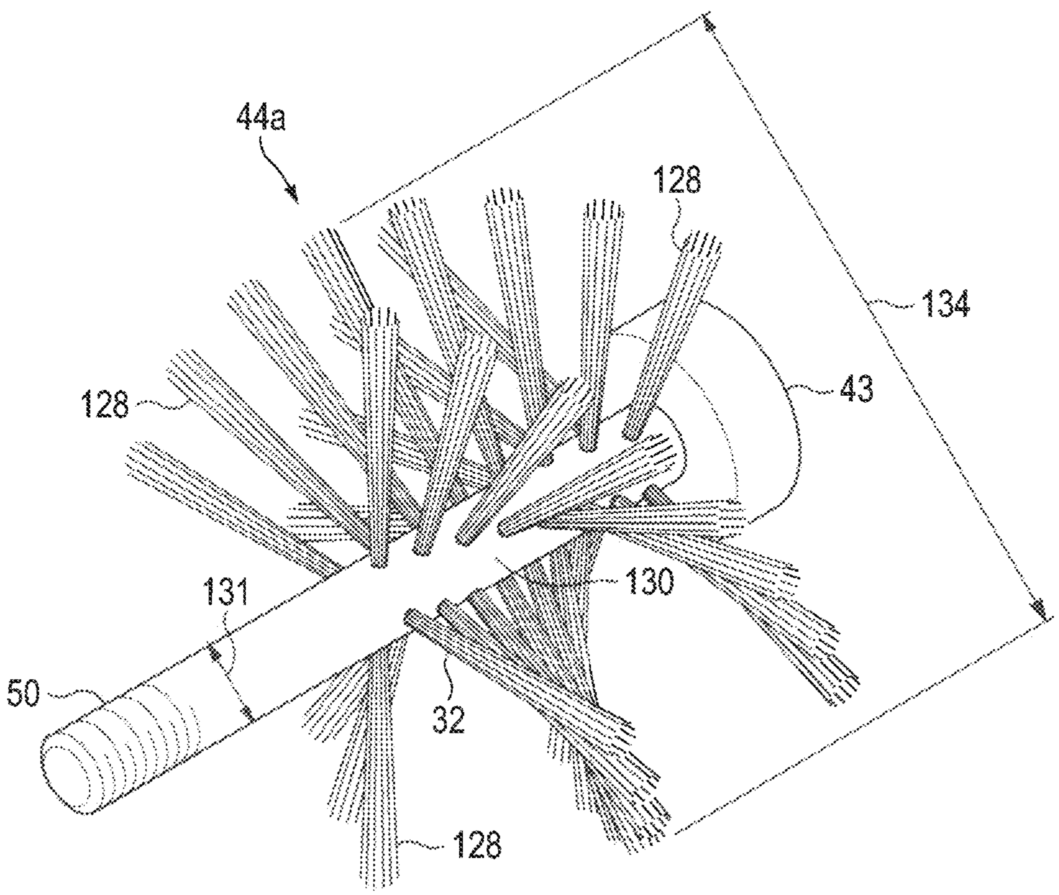
FIG. 9 is an isometric view of a first texture material rotary dispenser insert for use as a part of the surface texture material applicator shown in FIGS. 1-7.
Figure 10:
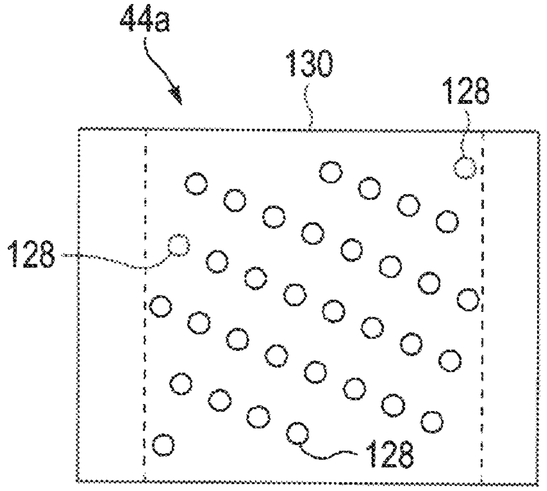
FIG. 10 is a diagrammatic representation of the locations of the several spatter elements on a central body of the rotary dispenser insert shown in FIG. 9.
Figure 11:
FIG. 11 is a pictorial representation of a surface texture of a wall surface on which surface texture material has been applied using the texture applicator shown in FIGS. 1-7 including the texture material rotary dispenser insert shown in FIG. 9.

As may be seen in FIGS. 9-26, several different rotary dispenser inserts 44*a*, 44*b*, 44*c*, 44*d*, and 44*e* may be used in the applicator 30 to provide particular surface textures by application of texture material. A first rotary dispenser insert 44*a*, shown in FIG. 9, has 34 spatter elements 128 arranged along its central body 130, that may be a shaft having a diameter 131 of 12.5 mm. The spatter elements 128 are mounted in helical rows on the central body 130, illustrated in FIG. 10 in the form of a planar development representing the cylindrical surface of the central body 130 in rolled out flattened form. Each of the spatter elements 128 in the first rotary dispenser insert 44*a* is a tuft 132 of 12 to 15 radially oriented resiliently flexible individual filaments of material such as individual strands of 60 pound test copolymer monofilament fishing line that are individually straight and slender, with a diameter of about 0.70 mm. The filaments thus may have a form similar to stiff bristles of a hairbrush. The individual filaments in the several tufts 132, mounted in the central body 130, are trimmed to approximately the same length, resulting in the rotary dispenser insert having a diameter 134 nearly equal to the internal diameter 36 of the chamber, so that the rotary dispenser insert 44*a* preferably has no more than 2 mm total radial clearance within the chamber 34. When the regulator 90 is in its substantially withdrawn position with the spatter element release edge 92 not located within the radius of the cylindrical part of chamber 34 the tufts 132 of filaments all extend substantially straight and radially away from the central body 130 of the first rotary dispenser insert 44*a* and may lightly contact the cylindrical interior surface of the chamber 34.

When texture material is applied using the first rotary dispenser insert 44*a* the regulator 90 is adjusted so that its spatter element release edge 92 is located to extend a selected distance into the cylindrical shape of the chamber 34 as shown, for example, in FIG. 7. As the dispenser insert 44*a* is rotated within the chamber 34 texture material from the container 112 is picked up from a lower part of the chamber 34 or may be received directly on the spatter elements 128. The spatter element release edge 92 interferes with free rotation of the rotary dispenser insert 44*a* and bends the tufts 132 of the spatter elements 128 as the dispenser insert 44*a* is rotated within the chamber 34. When the filaments of spatter elements 128 pass beyond the release edge 92 of the regulator 90 and are released, they spring resiliently toward their natural radial orientation and spatter the texture material out from the applicator 30, through the opening 76, as drops or droplets 136 that accumulate on a surface as shown in FIG. 3, to form a texture such as the fine orange peel texture 138 shown in FIG. 11, produced by a 10 second-long application of Standard Texture Mix texture material.

The applicator 30 is prepared for use by first removing the right end plate 46. This is done by removing the locking screw 72 and twisting the right end cover plate 46 counter-clockwise, moving the pins 66 in the slots 64 to release the bayonet mount. A rotary dispenser insert such as the insert 44*a* described above, chosen from among different available inserts 44, 44*a*, etc. to produce a desired texture, is placed into the chamber 34 so that its inner end 43 rests in the bearing cavity 42 in the left end plate 40. The right end plate 46 is replaced and secured with the locking screw 72, and the handcrank 100 may then be threaded onto the outer end of the shaft extension 50. The control valve 116 on the body of the applicator is closed. A cap (not shown) is removed from a container 112 of texture material, the body of the applicator 30 is inverted, and the receptacle portion 110 is screwed onto the open top of the container 112, with the control valve 116 kept closed. The applicator 30 may then be turned upright so that the container 112 of texture material is inverted above the body 32. The hex wrench 74 may then be used to open the air inlet valve 114 on the now upwardly-exposed bottom of the container 112.

Keeping the applicator 30 to 40 centimeters from the surface of a practice area, a user may begin turning the crank 100 on the right side of the body 32 while slowly opening the material control valve 116 on the left side. When the texture material is accumulating consistently with the desired appearance, the location of the valve lever 118 on the scale 120 should be noted, so that the control valve 116 can be opened again to the right degree without experimentation. Between applications of texture material to different areas being textured the control valve 116 should be closed so that the chamber 34 does not become flooded with texture material. When application is finished the air inlet valve 114 and the material control valve 116 should both be closed. The applicator 30 can be taken apart and washed out with water (if the Hamilton "A P" drywall mud mixed as described above has been used as the texture material.)

Figure 12:
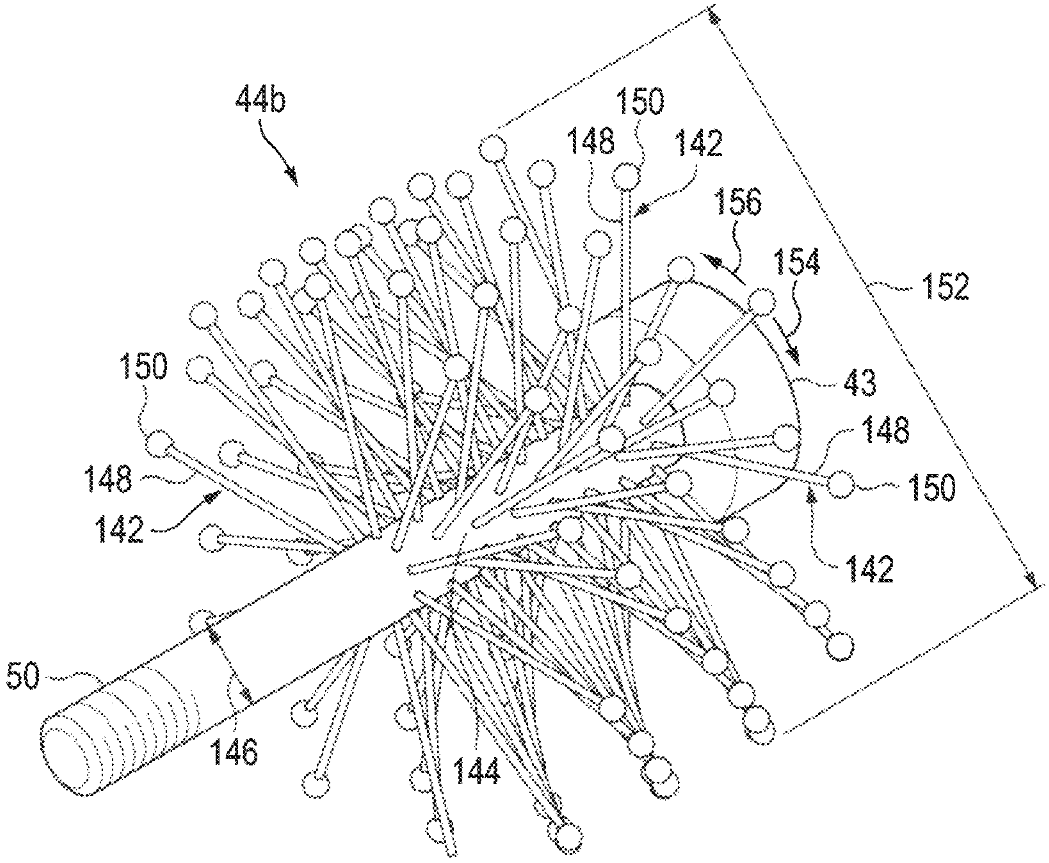
FIG. 12 is an isometric view of a second texture material rotary dispenser insert for use as a part of the surface texture material applicator shown in FIGS. 1-7.
Figure 13:
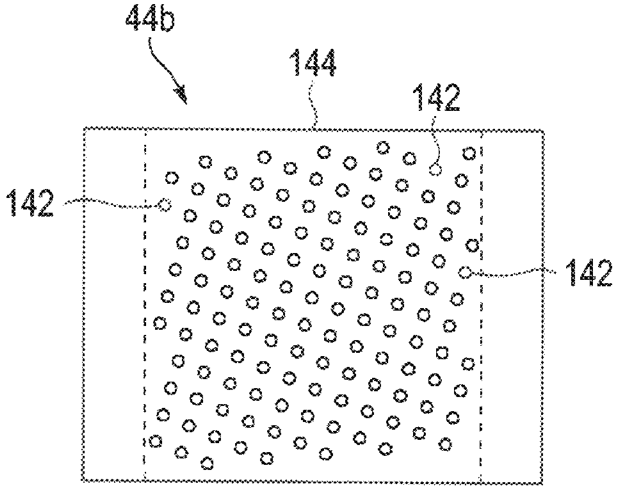
FIG. 13 is a diagrammatic representation of the locations of the several spatter elements on a central body of the rotary dispenser insert shown in FIG. 12.
Figure 14:
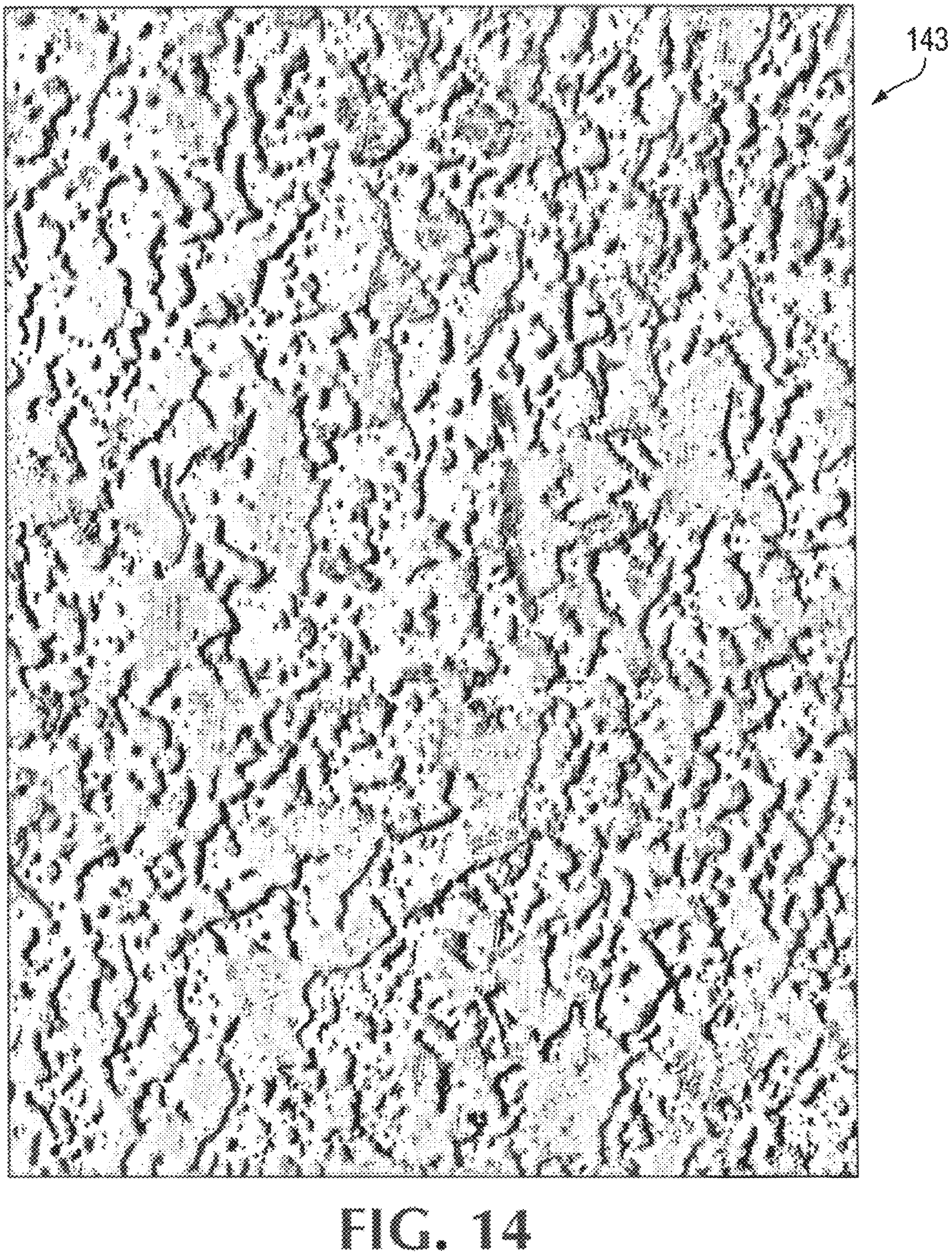
FIG. 14 is a pictorial representation of a surface texture of a wall area on which surface texture material has been applied by use of the texture applicator shown in FIGS. 1-7 including the texture material rotary dispenser insert shown in FIG. 12.

A second rotary dispenser insert **44*b* is shown in FIG. 12, and the arrangement of the spatter elements 142 on the central body 144 of the second rotary dispenser insert 44*b* is shown in planar development form in FIG. 13 as if the surface of the central body 144 of the dispenser insert 44*b* has been laid flat. A medium to large texture 143 with fine knockdown, achieved by use of the applicator 30 including the second rotary dispenser insert 44*b*, is shown in FIG. 14, where a ten-second application of texture material has been knocked down after an 8-minute wait. The central body 144 of the second rotary dispenser insert 44*b* also may be in the form of a shaft whose diameter 146 is also, for example, about 12.5 mm. There may be about 122 individual spatter elements 142 mounted on the central body 144 in a pattern of helical rows, with regular spacing of about 3 mm between rows and similar spacing between individual spatter elements 142 in each row. Each spatter element 142 has a stiff, yet resiliently flexible stem 148, which may be of, for example, a polymeric material such as a 150 pound test copolymer monofilament fishing line with a diameter of 1.11 mm. An outer end 150, or tip, of each spatter element 142 has an enlargement, such as a ball whose diameter may be around three times the diameter of the stem 148 of the spatter element 142. The ball on the outer end 150 may be made by, for example, melting the outer end of the stem 148, and is able to carry an amount of texture material in the form of a drop picked up as the spatter element 142 rotates through a quantity of texture material within the chamber 34. The rotary dispenser insert 44*b* has a diameter 152 of about equal to the diameter 36, allowing the insert 44*b* to rotate with little or no contact with the interior surface of the cylindrical portion of the chamber 34**.

As the dispenser insert **44*b* is rotated along and past the regulator 90 each spatter element 142, in turn, is forced to bend until its outer end passes free from the spatter element releasing edge 92 of the regulator 90. At that time the stem 148 of the spatter element springs back toward its original radial orientation and the drop of texture material is thrown forward and outward, through the opening 76, as the spatter element 142 springs beyond its original orientation and then returns to its original orientation, as indicated by the arrows 154 and 156 in FIG. 12**.

Figure 15:
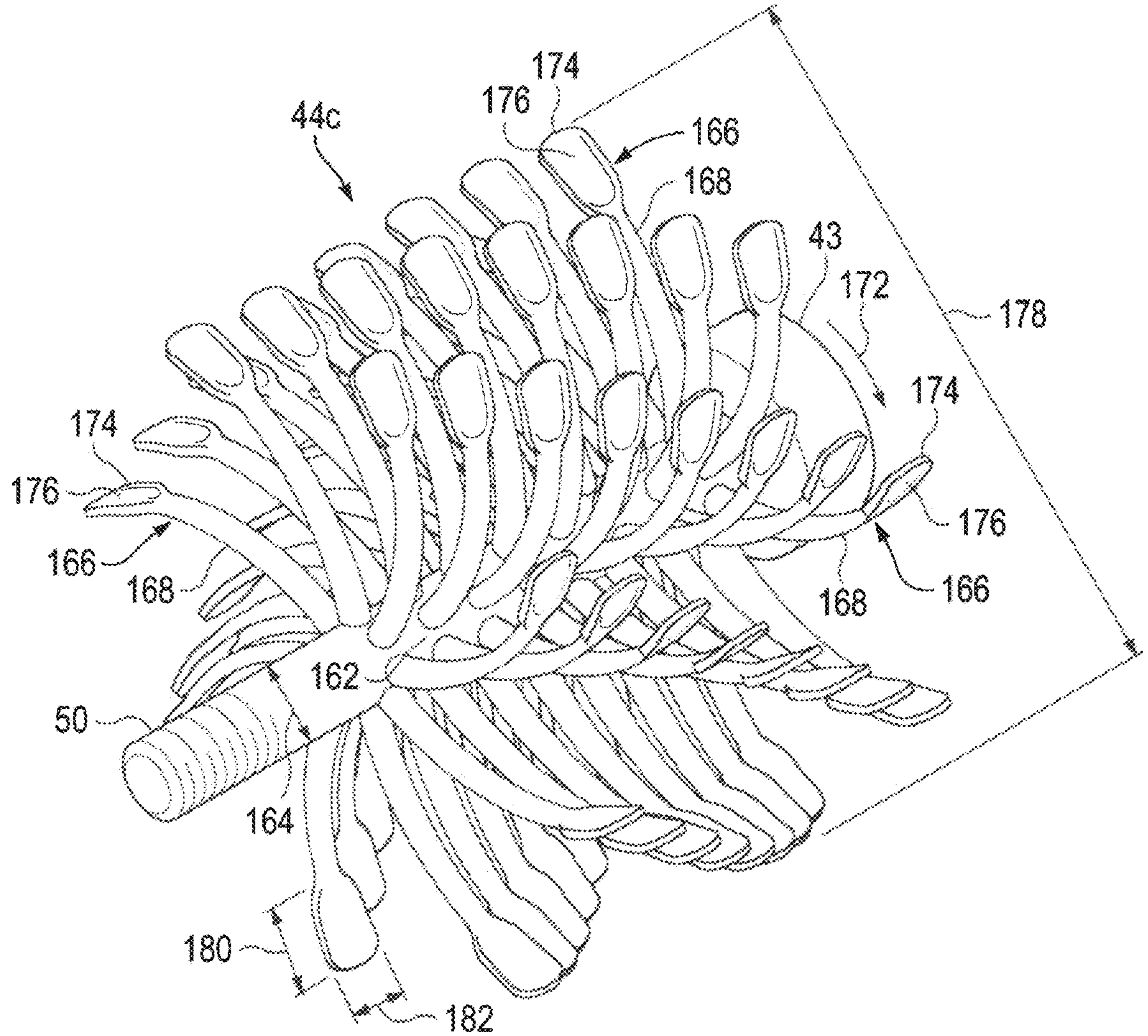
FIG. 15 is an isometric view of a third texture material rotary dispenser insert for use as part of the surface texture material applicator shown in FIGS. 1-7.
Figure 16:
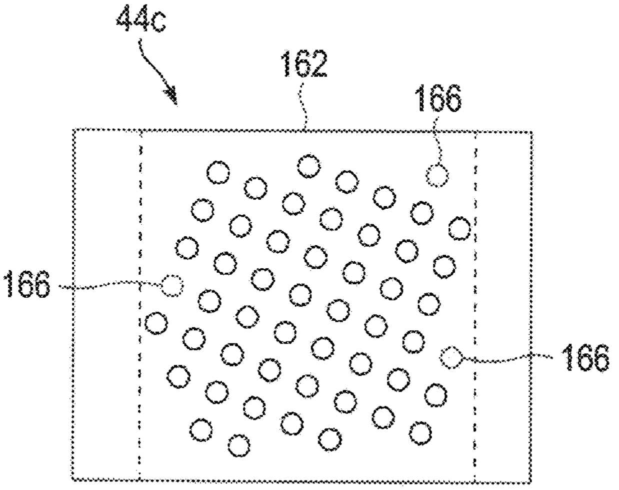
FIG. 16 is a diagrammatic representation of the locations of the several spatter elements on a central body of the rotary dispenser insert shown in FIG. 15.
Figure 17:
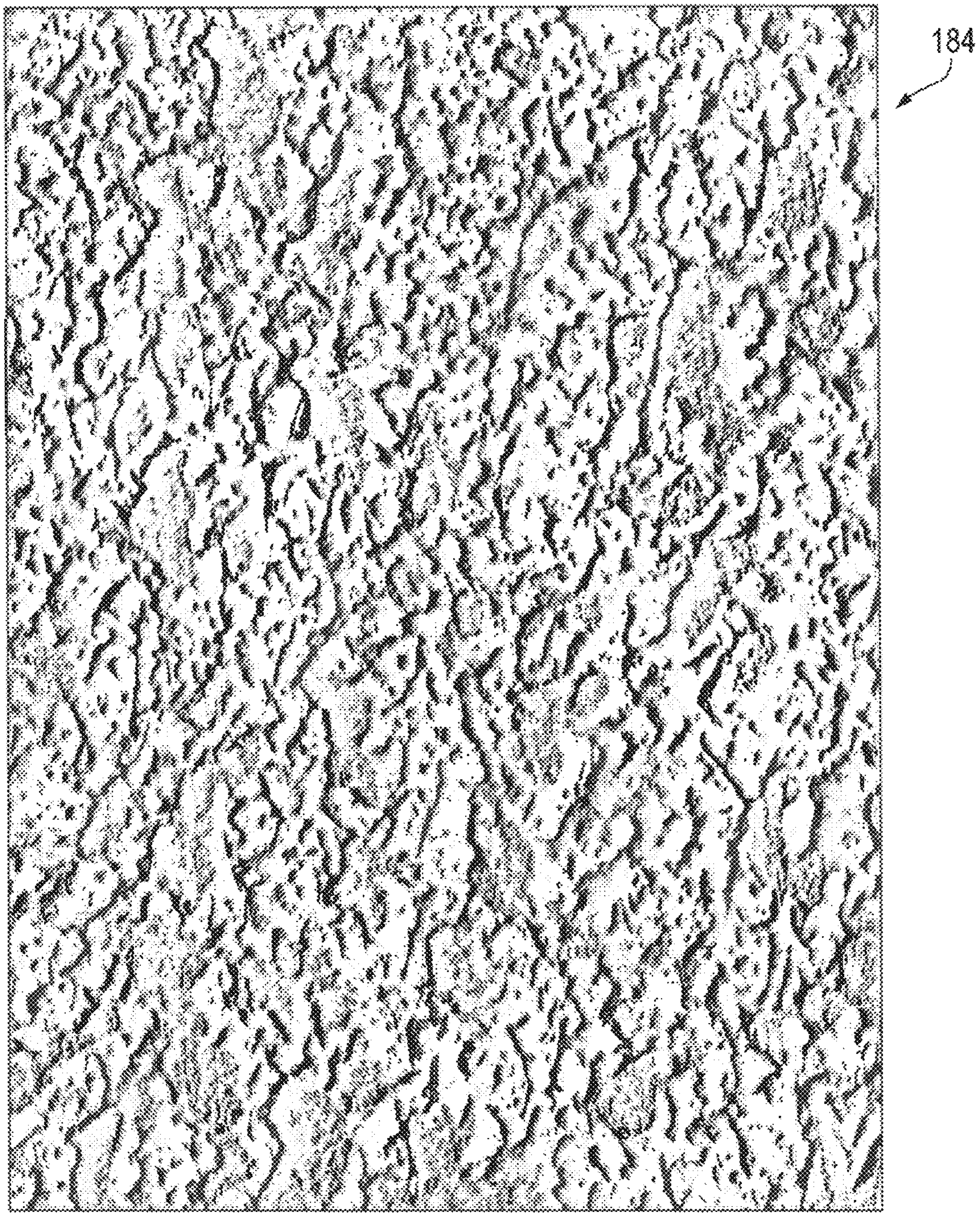
FIGS. 17 and 18 are pictorial representations of surface textures of ceiling areas on which surface texture material has been applied by the texture applicator shown in FIGS. 1-7 including the texture material rotary dispenser insert shown in FIG. 15.
Figure 18:

A third rotary dispenser insert **44*c* is shown in FIG. 15. As with the first and second rotary dispenser inserts 44*a* and 44*b*, the rotary dispenser insert 44*c* has a central body 162 in the form of a shaft which may have a diameter 164 of about 1.25 cm. A plurality of, for example, about 50, individual spatter elements 166 are arrayed on the central body 162, in a pattern shown diagrammatically as a planar development in FIG. 16. There are several individual spatter elements 166 arranged at regular spacing within each of a group of helical rows on the central body 162. For example, the individual spatter elements 166** may be spaced apart from each other by a distance of about 9.5 mm within each row, and the rows, similarly, may be spaced apart from each other by a distance of about 9.5 mm.

Each of the spatter elements 166 of the third rotary dispenser insert **44*c* has a relatively thick and stiff but resiliently flexible stem 168 whose base, or radially inner end 170 is mounted separately in the central body 162. The spatter elements 166 also may be of a polymeric plastic material such as weed trimmer line with the stem 168 having a diameter of about 2.92 mm. Each stem 168 may be curved slightly in a rearward direction relative to the usual direction of rotation of the third dispenser insert 44*c*. At a radially outer end of each spatter element stem 168 there is a small carrier member 174. The carrier member 174 may resemble a tiny paddle or spoon and may include a small depression 176 in which a quantity of texture material is picked up and carried as the third rotary dispenser insert 44*c* is rotated in the direction of the arrow 172 within the chamber 34. The diameter 178 of the third rotary dispenser insert 44*c* is about equal to the interior diameter 36 of the chamber 34, so that as the third rotary dispenser insert 44*c* is rotated the small carrier members 174 may lightly touch the interior surfaces of the chamber 34**.

The regulator 90 may be located in the slot 84 extending into the chamber 34 far enough to obstruct the carrier members 174 enough to bend the stems 168 of the spatter elements 166 slightly as the rotor of dispenser element **44*c* is rotated. When the carrier members 174 pass clear of the spatter element release edge 92 of the regulator 90, the individual carrier members 174 spring fee and throw large drops of texture material radially out from the chamber 34 through the opening 76. The drops of texture material that can be thrown by the carrier members 174 are relatively large by comparison with the drops 136 that can be thrown by the spatter elements of the first and second rotary dispenser inserts 44*a* and 44*b* discussed above, since each carrier member 174 may have a radial length 180 of 7.9 mm and an axial width 182 of 6.4 mm, for example. Relatively coarse textures, such as those ceiling textures shown in FIG. 17 and FIG. 18, can be applied by the applicator 30 with the third rotary insert dispenser insert 44*c* in use, with differences in the textures resulting from use of a different but generally similar texture material, different adjustments of the regulator 90 and the control valve 116**, and different lengths of time during which texture material is applied.

Figure 19:
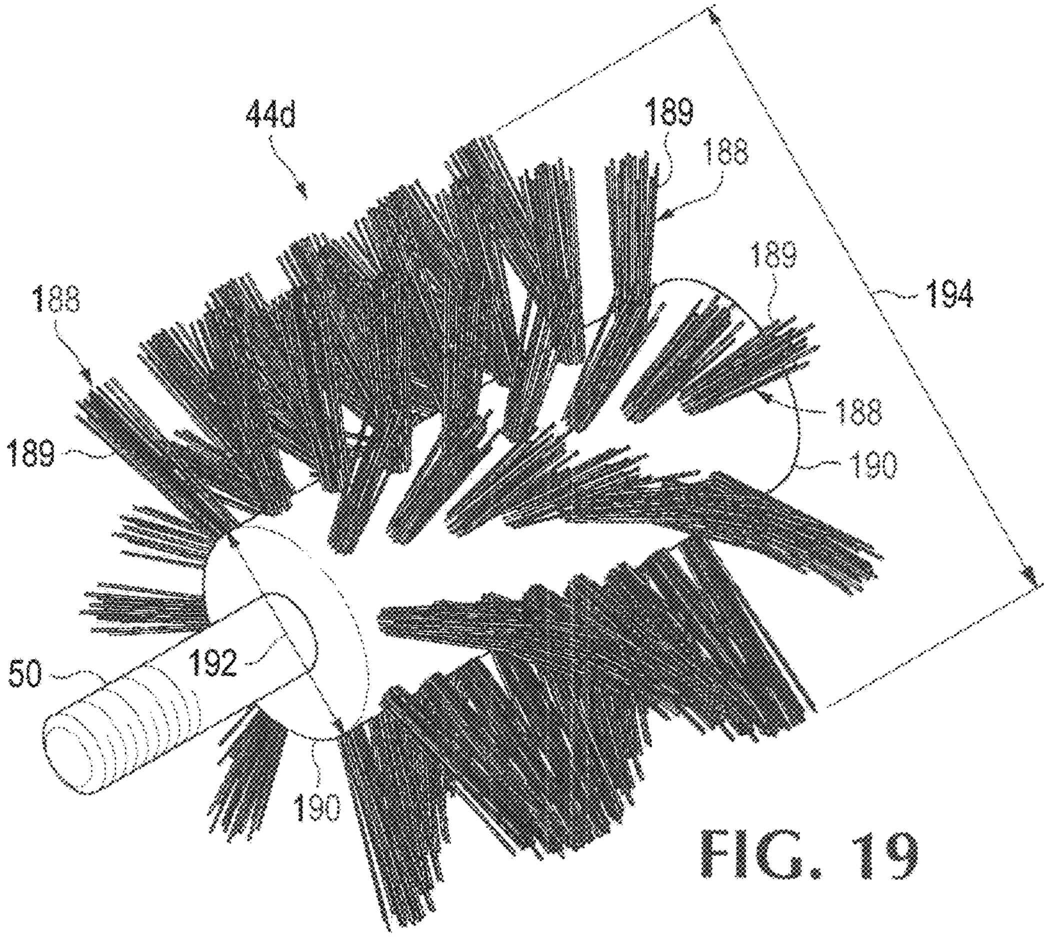
FIG. 19 is an isometric view of a fourth texture material rotary dispenser insert for use as part of the surface texture material applicator shown in FIGS. 1-7.
Figure 20:
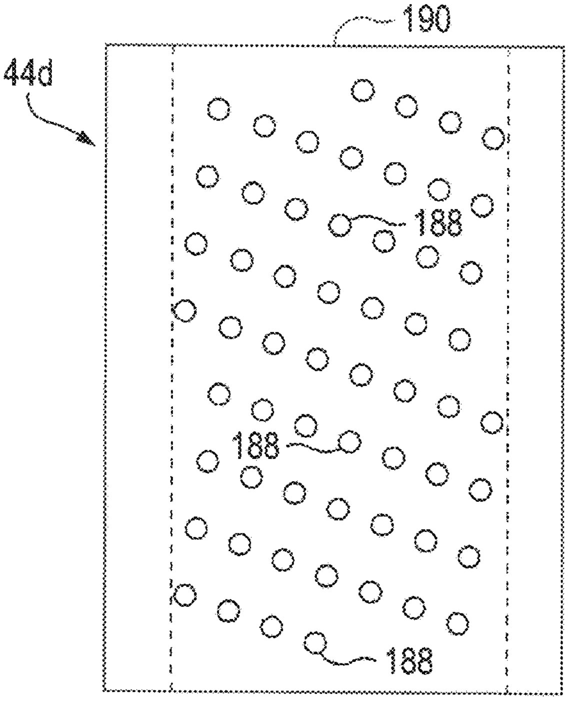
FIG. 20 is a diagrammatic representation of the locations of the several spatter elements on a central body of the rotary dispenser insert shown in FIG. 19.

A fourth rotary dispenser insert **44*d* shown in FIG. 19 has spatter elements 188 that are tufts each having about a dozen radially disposed parallel filaments 189 held closely together. All of the spatter elements 188 or tufts are mounted in a central body 190 in a pattern shown in a planar development in FIG. 20. The spatter elements may be spaced about 6.4 mm, center-to-center, in helical rows that are spaced apart from each other by a slightly greater distance such as, for example 9.5 mm. The central body 190 has a larger diameter 192, of 25.4 mm, for example, that is larger than that of the central body 130, 144, or 162 of the first through third rotary dispenser inserts. The individual filaments 189 of each spatter element 188 are therefore shorter than those of, for example, the spatter elements 128 in first rotary dispenser insert 44***a*. The fourth rotary dispenser insert 44*d* has a diameter 194 that may be equal to the inside diameter 36 of the chamber 34 of the applicator 30, or very slightly greater, so that the fourth rotary dispenser insert 44*d* is easily rotated in the chamber 34, and encounters only a slight amount of resistance as the outer ends of the spatter elements 188 rub against the inside of the chamber 34, so long as the regulator 90 is retracted in the slot 84 to where it does not contribute to resisting rotation of the dispenser insert 44*d*.

Figure 21:
FIGS. 21 and 22 are pictorial representations of surface textures of wall surfaces on which surface texture material has been applied using the texture material applicator shown in FIGS. 1-7 including the texture material rotary dispenser insert shown in FIG. 19.
Figure 22:

The regulator 90 can be adjusted to bend the spatter elements 188 back a small amount as the fourth rotary dispenser insert 44*d* is rotated, and when the spatter elements 188 pass by the spatter element release edge 92 of the regulator 90 and throw droplets of texture material the result can be a medium orange peel texture 198 as shown in FIG. 21, or a large orange peel texture 200, as shown in FIG. 22, depending upon factors controlled by the user, including the rate at which the control valve 116 admits texture material to the chamber 34 from the supply container 112, the position to which the regulator 90 is adjusted, the distance from the applicator 30 to the surface on which a texture is being created, and the length of time during which the applicator 30 is spattering texture material onto the surface.

Figure 23:
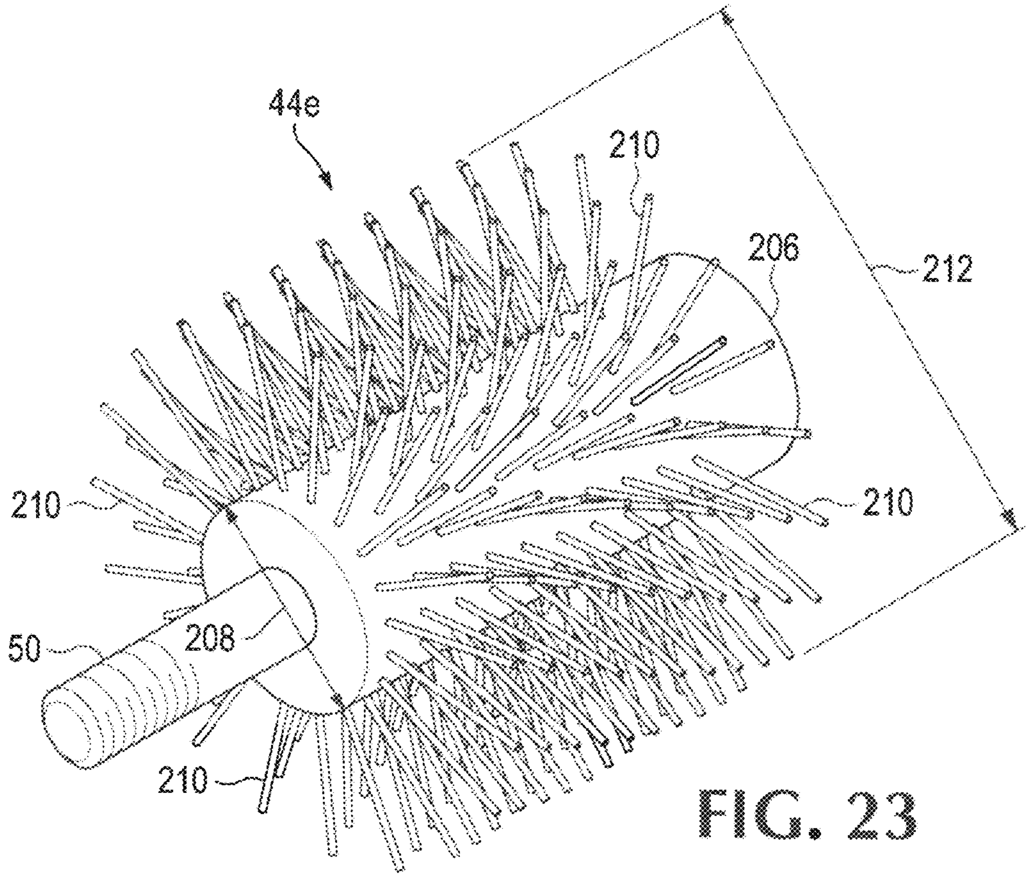
FIG. 23 is an isometric view of a fifth texture material rotary dispenser insert for use as part of the surface texture material applicator shown in FIGS. 1-7.
Figure 24:
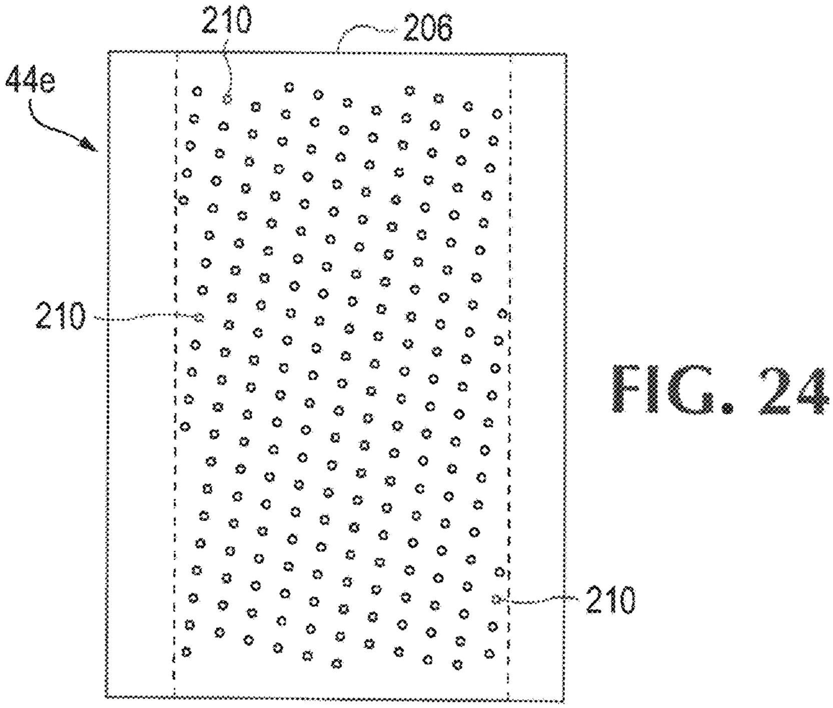
FIG. 24 is a diagrammatic representation of the locations of the several spatter elements on the central body of the texture material rotary dispenser insert shown in FIG. 23.
Figure 25:
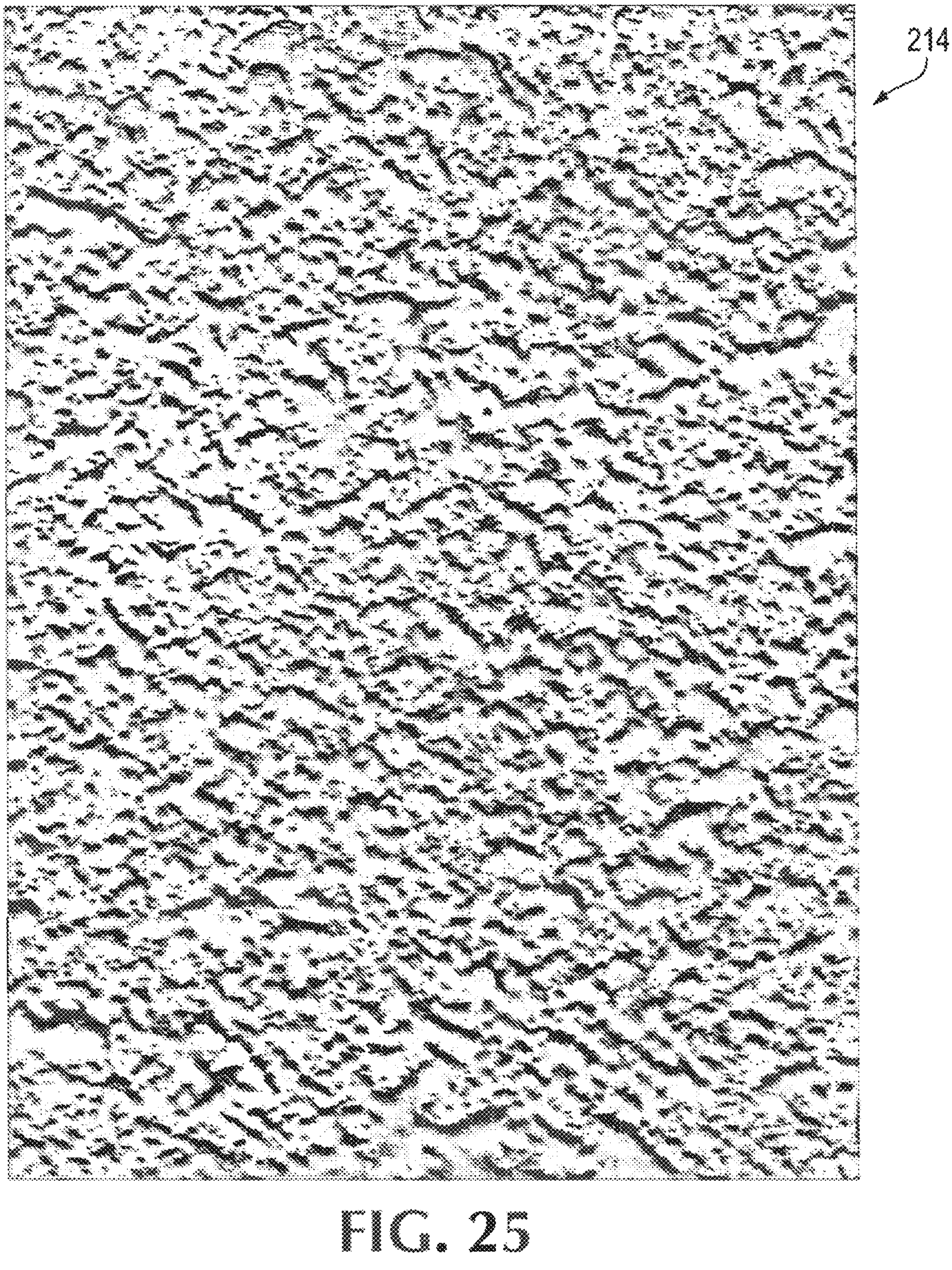
FIGS. 25 and 26 are pictorial representations of surface textures of wall surfaces on which texture material has been applied by use of the texture material applicator shown in FIGS. 1-7 including the texture material rotary dispenser insert shown in FIG. 23.
Figure 26:
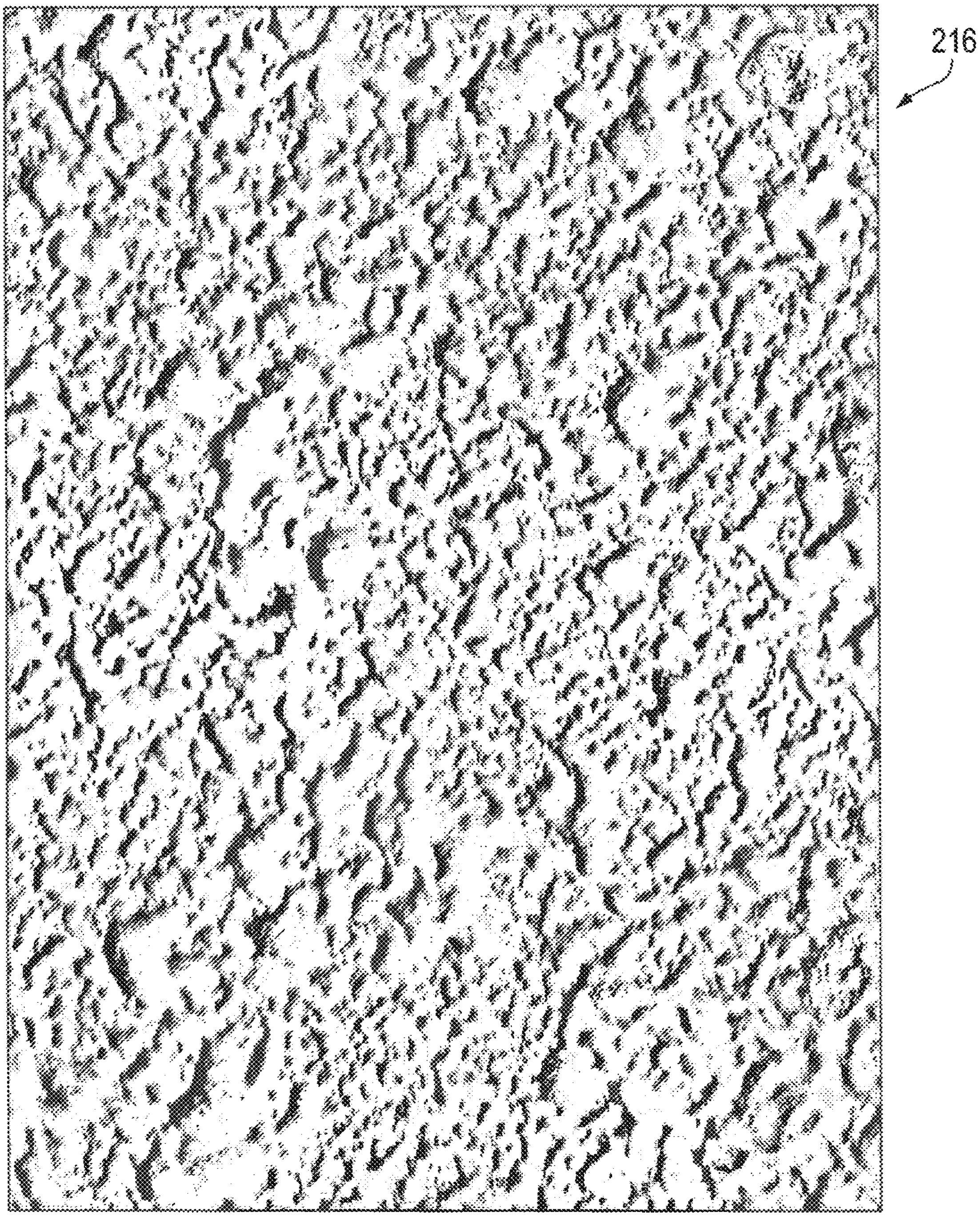

In FIG. 23 a fifth rotary dispenser insert 44*e* is depicted. The fifth rotary dispenser insert 44*e* has a large central body 206, which may be of the same size as the central body 190 of the fourth rotary dispenser insert 44*d* described above, with a diameter 208 of about 25.4 mm. Individual spatter elements 210 which may be individual stiff yet resiliently flexible filaments are individually mounted in the central body 206 in helical rows, with the individual polymer filaments 210 spaced apart from one another by distances of, for example 4.8 mm, center-to-center, in each row, and with the rows spaced apart from one another by about the same distance, as shown as a planar development in FIG. 24. The spatter elements 210 may be, for example, lengths of polymeric material such as monofilament nylon fishing line or weed trimmer line with a diameter of 2.67 mm, which may be similar to stiff synthetic bristles for a hairbrush. The spatter elements 210 are of a slightly shorter length than the spatter elements 188 of the fourth rotary dispenser insert 44*d*, so that the fifth rotary dispenser insert 44*e* has a diameter 212 of 58.5 mm, slightly smaller than the inside diameter 36 of the chamber 34. The fifth rotary dispenser insert 44*e* thus is able to be rotated freely within the chamber 34 without the spatter elements 210 touching the interior surface. When the regulator 90 is adjusted to be engaged by the spatter elements 210 of the rotating fifth rotary dispenser insert 44*e*, droplets of texture material are thrown out as the spatter elements 210 pass free of the spatter element release edge 92 of the regulator 90. The applicator 20 can then produce an orange peel texture 214 such as that shown in FIG. 25 or a larger orange peel texture 216 such as that shown in FIG. 26, depending, again on the consistency of the texture material, the adjustment of the texture material inlet control valve 116, the adjustment of the regulator 90, and the length of time during which texture material is applied.

From the foregoing it can be seen that the applicator described above can be used to apply texture material to a wall or ceiling to reliably produce any of several different commonly used textures, by using a selected one of the rotary dispenser inserts 44, 44*a*, etc. in the applicator 30 to apply texture material received in the chamber 34 at a rate controlled by the adjustment of the inlet control valve 116 and with the regulator 90 adjusted to a location in which the spatter elements 98, 128, etc. are bent and then released to throw texture material toward a wall or ceiling.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A texture material applicator for forming a texture on a flat surface, comprising:

(a) a body including a dispenser housing defining a chamber and an outlet opening from the chamber, the chamber further including a texture material control valve connected to a lever and a scale adjacent to the lever on the exterior of the housing, the lever together with the scale is arranged to regulate passage of texture material through the inlet conduit, the scale representing the degree to which the valve is open;

(b) a receptacle mounted on top of the body, the receptacle communicating with an inlet conduit leading into the chamber and configured to receive and hold an open mouth of a container of texture material;

(c) a rotary dispenser mounted in the body, the rotary dispenser including a central body located within the chamber, and the central body of the rotary dispenser being supported for rotation about a central axis extending through the chamber;

(d) a plurality of resiliently flexible spatter elements carried on the central body in respective original positions in which the flexible spatter elements extend in a helical manner away from the central axis, the flexible spatter elements having outer ends collectively defining a diameter of the rotary dispenser insert; and (e) a regulator having a top and bottom portion, the top portion mounted in the body directly above the outlet opening, adjacent to the receptacle and extending into the outlet opening, the top portion further including a tab extending perpendicular to the exterior of the body, and the bottom portion including a spatter element release edge extending into the upper margin of the chamber and into paths of the outer ends of the flexible spatter elements during rotation of the rotary dispenser, so that rotation of the rotary dispenser within the chamber bends ones of the flexible spatter elements resiliently against the bottom portion of the regulator, until the ones of the outer ends of the flexible spatter elements move past the spatter element release edge of the regulator and are released, allowing the ones of the flexible spatter elements to spring resiliently toward their respective original positions.

2. The apparatus of claim 1 wherein the body includes an end panel and the rotary dispenser includes central shaft including an outer portion extending through an opening defined in the end panel along the central axis.

3. The apparatus of claim 2 including a crank attached drivingly to the outer portion of the central shaft so as to rotate the rotary dispenser within the chamber.

4. The apparatus of claim 1 wherein the body includes a base defining a bottom plane parallel with the central axis whereby the apparatus can be firmly placed on a table and remain in an upright orientation, the base is directly connected to a drip catcher having a horizontal lip, the lip extending along a bottom margin of the outlet opening parallel with the central axis of the applicator.

5. The apparatus of claim 4 wherein the regulator is movable adjustably toward or away from the central axis by the tab so as to place the spatter element release edge in position to extend a selected distance into the path of an outer end of a respective one of the spatter elements.

6. The apparatus of claim 4 wherein the chamber includes a bottom portion adapted to contain a quantity of texture material where the outer ends of the flexible spatter elements must pass through the quantity of texture material during rotation of the rotary dispenser, the lip of the drip catcher having a curvature directly extending into the bottom portion to allow the texture material to flow back into the bottom portion as an unbroken stream.

7. The apparatus of claim 6 wherein a plurality of the spatter elements are tufts, and wherein each of the tufts includes a plurality of thin flexible filaments of similar lengths and having respective outer ends located at similar radii from the central axis.

8. The apparatus of claim 6 wherein a plurality of flexible spatter elements are individual resiliently flexible lengths of polymeric plastics filament materials separately mounted in the central body.

9. The apparatus of claim 8 wherein each of the flexible spatter elements has a spherical enlargement at its respective outer end.

10. The apparatus of claim 6 where a plurality of the flexible spatter elements include individual, separately mounted, resiliently flexible thick stems each having a respective small carrier member mounted at its outer end, each carrier member having a surface with a depression defined from a radial length and an axial width, the depression extending to the distal end of the axial width opposing the stem.

11. The apparatus of claim 6 wherein the body has a first end member defining a cavity that is open toward the interior of the chamber and wherein the cavity serves as a bearing and the rotary dispenser has an inner end rotatably supported in the bearing.

12. The apparatus of claim 6 wherein the body includes a removable end member, and wherein the removable end member defines a circular groove and the body includes a circular rim surrounding the chamber at an end of the chamber and extending axially of the body and into the circular groove, and wherein the removable end member and the body are connected by a bayonet mount joint including the groove and the circular rim.

13. The apparatus of claim 1 wherein ones of the plurality of flexible spatter elements are located on the central body of the rotary dispenser in a pattern that defines a plurality of helical rows of spatter elements located on the central body.

* * * * *